United States Patent
Berrie et al.

[15] 3,642,427
[45] Feb. 15, 1972

[54] COLORATION PROCESS

[72] Inventors: Alistair Howard Berrie; Nigel Hughes, both of Manchester, England

[73] Assignee: Imperial Chemical Industries Limited, London, England

[22] Filed: June 23, 1969

[21] Appl. No.: 835,750

[30] Foreign Application Priority Data

June 27, 1968    Great Britain......................30,762/68

[52] U.S. Cl..........................................8/41 B, 8/50, 8/41 C, 8/176, 8/21 C, 8/21 R
[51] Int. Cl. ......................................................C09b 27/00
[58] Field of Search.....................8/41, 41.2, 41.3, 54.2, 179; 260/156

[56] References Cited

UNITED STATES PATENTS 3,487,006    12/1969    Ritter.....................................260/156

Primary Examiner—George F. Lesmes
Assistant Examiner—B. Bettis
Attorney—Cushman, Darby & Cushman

[57] ABSTRACT

Process for coloring polyamide, cellulose acetate and polyester textile materials with an aqueous dispersion of a disperse monoazo dyestuff of the formula:

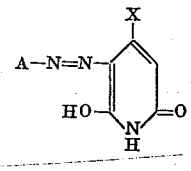

wherein A is an optionally substituted phenyl or naphthyl radical and X is a hydrogen atom, an optionally substituted alkyl or phenyl radical or a cyano, carboxylic acid ester or carbonamido group.

2 Claims, No Drawings

COLORATION PROCESS

This invention relates to a coloration process for synthetic textile materials, in particular aromatic polyester textile materials.

According to the invention there is provided a process for coloring synthetic textile materials which comprises treating said textile materials with an aqueous dispersion of a water-insoluble monoazo dyestuff, which, in one of the possible tautomeric forms, is represented by the formula:

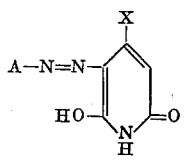

wherein A is an optionally substituted aryl radical, X is a hydrogen atom, or an optionally substituted alkyl or aryl radical, or a —CN, —COOR or —CONR$^1$R$^2$ radical, wherein R is an optionally substituted alkyl or aryl radical and R$^1$ and R$^2$ each independently represent a hydrogen atom or an optionally substituted alkyl or aryl radical, or R$^1$ and R$^2$ together with the nitrogen atom N form a 5- or 6-membered nitrogen containing heterocyclic ring, the dyestuffs being free from carboxylic acid and sulphonic acid groups.

The dyestuffs used in the process of the invention can exist in a number of possible tautomeric forms. For convenience the dyestuffs have only been formulated in one of these forms but it is to be understood that the specification include the use of the dyestuffs in any of the possible tautomeric forms.

As examples of the optionally substituted aryl radicals represented by A there may be mentioned optionally substituted naphthyl radicals and preferably optionally substituted phenyl radicals, in particular phenyl radicals which contain one or more of the same or different substituents such as chlorine, bromine, methyl, methoxy, cyano, nitro, lower alkyl sulphonyl, acyl, lower alkyl carbonyl, carbo lower alkoxy, trifluoromethyl, sulphonamido, N-lower alkyl sulphonamido, N:N-di(lower alkyl) sulphonamido, sulphamato (—O.SO$_2$NH$_2$) and N-lower alkyl and N:N-di(lower alkyl) derivatives thereof, carbonamido and N-lower alkyl and N:N-di(lower alkyl) derivatives thereof, phenyl, and phthalyl which combines so as to form an anthraquinone nucleus.

Throughout this specification the terms lower alkyl and lower alkoxy are used to denote alkyl and alkoxy radicals respectively containing from one to four carbon atoms.

The optionally substituted alkyl radicals represented by R, R$^1$, R$^2$ and X are preferably optionally substituted lower alkyl radicals; and as examples of such radicals there may be mentioned lower alkyl such as methyl, ethyl, n-propyl and n-butyl, hydroxy lower alkyl such as β-hydroxyethyl, aryl lower alkyl such as benzyl and β-phenylethyl and alkoxy lower alkyl such as β-(methoxy or ethoxy)ethyl. The optionally substituted aryl radicals represented by X, R, R$^1$ and R$^2$ are preferably optionally substituted phenyl radicals; and as examples of such radicals there may be mentioned phenyl itself and tolyl, anisyl, chlorophenyl, bromophenyl and dimethylphenyl.

As examples of the 5- and 6-membered nitrogen containing heterocyclic rings obtained by joining together R$^1$, R$^2$ and the nitrogen atom there may be mentioned piperidino, morpholino and pyrrolidino.

The process of the invention may be conveniently carried out by immersing the synthetic textile material in a dyebath comprising an aqueous dispersion of a monoazo dyestuff as hereinbefore defined, the dispersion being stabilized, if desired, by dispersing agents, for example nonionic dispersing agents, cationic dispersing agents, and anionic dispersing agents or a mixture of two or more such dispersing agents. Dyeing is then carried out at the temperatures usually employed for the particular textile material. Thus in the case of secondary cellulose acetate textile materials it is preferred to carry out the dyeing process at a temperature between 60° and 85° C.; in the case of cellulose triacetate or polyamide textile material, it is preferred to carry out the dyeing process at 95° to 100° C.; in the case of aromatic polyester textile materials the dyeing process can either be carried out at a temperature between 90° and 100° C., preferably in the presence of a carrier such as diphenyl or o-hydroxydiphenyl, or at a temperature above 100° C., preferably at a temperature between 120° and 140° C., under superatmospheric pressure.

Alternatively an aqueous dispersion of the monoazo dyestuff can be padded onto the synthetic textile material, and the dyestuff is then fixed on to the textile material by steaming it for short periods at temperatures between 100° and 160° C. or by baking it at temperatures between 160° and 220° C. If desired the padding liquor can contain the conventional additives, for example dispersing agents, thickeners, migration inhibitors, or urea.

As a further alternative a thickened printing paste containing the monoazo dyestuff in dispersed form can be applied to the surface of the synthetic textile materials by any of the methods conventionally used for applying printing pastes to synthetic textile materials, for example by block, screen or roller printing. The printed textile material, optionally after being dried, is then steamed for short periods at temperatures between 100° and 160° C. or is baked at temperatures between 160° and 220° C. Suitable thickening agents which are present in the printing paste include gum tragacanth, gum arabic, alginates, or oil-in-water or water-in-oil emulsions.

If desired mixtures of the said monoazo dyestuffs can be used, or there can be used mixtures of the said monoazo dyestuffs with other disperse dyestuffs, such as are described in, for example, British specifications Pat. Nos. 806271, 835819, 840903, 847175, 852396, 852493, 859899, 865328, 872204, 894012, 908656, 909843, 910306, 913856, 919424, 944513, 944722, 953887, 959816, 960235 and 961412.

At the conclusion of the process the colored textile material is preferably rinsed in water and/or given a treatment in an aqueous solution of soap or a synthetic detergent before being dried. In the case of aromatic polyester textile materials it is also preferred to subject the colored textile material to a treatment in an alkaline aqueous solution of sodium hydrosulphite before the soaping treatment in order to remove loosely attached dyestuff from the surface of the textile material.

As examples of synthetic textile materials which can be colored by the process of the invention there may be mentioned cellulose acetate and cellulose triacetate textile materials, polyamide textile materials such as polyhexamethyleneadipamide textile materials, and preferably aromatic polyester textile materials such as polyethylene terephthalate textile materials. Such textile materials can be in the form of thread, yarn, or woven or knitted fabric. If desired the synthetic textile materials can be in the form of unions with other textile materials, for example polyester/cotton or polyester/wool unions, in which case the dyeing, padding or printing liquor usually contains a suitable dyestuff or dyestuffs, such as reactive dyestuffs, for coloring any non-synthetic textile material present in the union.

By the process of the invention synthetic textile materials can be colored in a wide variety of shades having excellent fastness to the fastness tests commonly applied to the particular textile material, for example to light, to wet treatments and, in the case of synthetic textile materials such as aromatic polyester or cellulose triacetate textile materials to dry heat treatments. The monoazo dyestuffs, as hereinbefore defined, also have excellent buildup properties on synthetic textile materials so that heavy depths of shade can be readily obtained.

The monoazo dyestuffs used in the process of the invention can themselves be obtained by coupling a diazo compound derived from an amine of the formula: A—NH$_2$ with a coupling component of the formula:

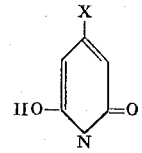

wherein A and X have the meanings stated above, the coupling being carried out under aqueous alkaline conditions, and the amine and coupling component being free from carboxylic acid and sulphonic acid groups.

As examples of the amines of the formula A—NH$_2$ there may be mentioned aniline, o-, m- or p-toluidine, o-, m- or p-anisidine, o-, m- or p-chloroaniline, o-, m- or p-bromoaniline, o-, m- or p-nitroaniline, 2:5-dichloroaniline, 2:4-dinitroaniline, 2:4-dinitro-6-(chloro or bromo)-aniline, 4-methanesulphonylaniline, 4-amino-benzotrifluoride, 4- or 5-nitro-2-toluidine, 4- or 5-nitro-2-anisidine, 4- or 5-chloro-2-anisidine, 4- or 5-chloro-2-toluidine, 4- or 5-bromo-2-anisidine, 2:6-di(chloro- or bromo-)-4-nitroaniline, 2:4:6-trinitroaniline, 2:4-dinitro-6-carbomethoxyaniline, 2-amino-5-nitrobenzotrifluoride, 2:4-bis(methanesulphonyl)-aniline, 2-(chloro- or bromo-)-4-nitroaniline, methyl-anthranilate, 4- or 5-nitromethylanthranilate, 4-amino-benzamide, 2:6-di(chloro- or bromo-)-aniline-4-sulphonamide, 2:6-di(chloro- or bromo-)-4-methylsulphonylaniline, 2:5-di-(chloro- or bromo-)-4:6-dinitroaniline, 2-amino-3:5-dinitrobenzotrifluoride, 3-amino-2-(chloro- or bromo-)-4:6-dinitro-(toluene or anisole), 3-amino-4-(chloro- or bromo-)-2:6-dinitro-(toluene or anisole), 2- or 4-cyanoaniline, 4-nitro-2-cyanoaniline, 2:4-dinitro-6-cyanoaniline, 2-nitro-4-cyanoaniline, 2-chloro-4-cyanoaniline, 3amino-2:4:6-trinitrotoluene, 2-(chloro- or bromo-)-4-methylsulphonylaniline, 3-(chloro- or bromo-)-4-thiocyanatoaniline, 2-(chloro- or bromo-)-4-sulphamylaniline, 2-amino-5-nitrophenylmethane-sulphone, 2-amino-3:5-dinitrophenylmethylsulphone, 2-amino-3-(chloro- or bromo-)-5-nitrophenylmethylsulphone, 2-sulphamyl-4-nitroaniline, 2-methylsulphamyl-4-nitroaniline, 2-ethylsulphamyl-4-nitroaniline, 2-butylsulphamyl-4-nitro-aniline, 2-dimethylsulphamyl-4-nitroaniline, 2-methyl-sulphamyl-4:6-dinitroaniline, 2-methyl-sulphamyl-4-nitro-6-(chloro- or bromo-)aniline, 2-phenyl-sulphamyl-4-nitroaniline, methyl 2-amino-3-(chloro- or bromo-)-5-nitrobenzoate, dimethyl 2-aminoterephthalate, dimethyl 2-amino-5-nitroterephthalate, aniline -2-, 3- or 4-sulphamate, aniline-2-, 3- or 4-N:N-dimethylsulphamate, 1-naphthylamine, 1- or 2-aminoanthraquinone, 4-aminodiphenyl and 4-diethylaminoaniline.

The coupling components of the above formula can themselves be obtained by a variety of methods such as are described in, for example, "Heterocyclic Compounds—Pyridine and its Derivatives—Part 3" edited by Klingsberg which was published by Interscience Publishers in 1962. For example by cyclisation of ester, amide or nitrile derivatives of the appropriate β-substituted glutaconic acid.

As specific examples of the said coupling components there may be mentioned 2:6-dihydroxypyridine, 2:6-dihydroxy-4-methylpyridine, ethyl 2:6-dihydroxy iso-nicotinate, 2:6-dihydroxy iso-nicotinamide, 2:6-dihydroxy iso-nicotinic acid diethylamide, 2:6-dihydroxy-4-cyanopyridine, 2:6-dihydroxy-4-phenylpyridine, 2:6-dihydroxy-4-(p-hydroxyphenyl)pyridine and 2:6-dihydroxy-4-(p-methoxyphenyl)pyridine.

Preferred classes of dyestuffs for use in the process of the invention are the dyestuffs wherein A represents an optionally substituted phenyl radical, and wherein X represents a carbo lower alkoxy radical which is optionally substituted by hydroxy or lower alkoxy groups.

The invention is illustrated but not limited by the following Examples in which the parts and percentages are by weight.

EXAMPLE 1

100 parts of a woven aromatic polyester textile material are immersed in a dyebath comprising a dispersion of 1 part of 2:6-dihydroxy-3-(phenylazo)-4-carboethoxypyridine (which was obtained by the method described in Volume 81 of the Journal of the American Chemical Society at page 6057) in 3,000 parts of water containing 1 part of oleyl sodium sulphate. The dyebath is then heated to 130° C. during 30 minutes and maintained at this temperature for a further hour under superatmospheric pressure. The dyed textile material is then removed from the dyebath, rinsed in water, immersed for 15 minutes in an aqueous solution at 50° C. containing 0.2 percent of sodium hydroxide, 0.2 percent of sodium hydrosulphite and 0.1 percent of cetyl trimethylammonium bromide. The textile material is again rinsed in water, then immersed for 15 minutes in a warm dilute aqueous solution of a synthetic detergent, rinsed again in water and finally dried.

The aromatic polyester textile material is thereby dyed a greenish yellow shade possessing excellent fastness to light, to wet treatments and to dry heat treatments.

The following Table gives further Examples illustrating the process of the invention which are carried out by replacing the dyestuff used in Example 1 by the dyestuffs obtained by diazotizing the amines listed in the second column of the Table and coupling the resulting diazo compounds with the coupling components listed in the third column of the Table. The fourth column of the Table lists the shades of the resulting dyeings.

| Example | Amine | Coupling Component | Shade |
|---|---|---|---|
| 2 | 4-chloroaniline | 2:6-dihydroxy-4-carboethoxypyridine | Greenish-yellow. |
| 3 | 2-nitroaniline | do | Do. |
| 4 | 4-methoxy-2-nitroaniline | do | Orange. |
| 5 | Ethyl 4-aminobenzoate | do | Greenish-yellow. |
| 6 | 4-aminodiphenyl | do | Yellow. |
| 7 | 1-aminoanthraquinone | do | Reddish-yellow. |
| 8 | 2-anisidine | do | Do. |
| 9 | 1-naphthylamine | do | Do. |
| 10 | 2-chloro-1-naphthylamine | do | Do. |
| 11 | β-Methoxyethyl 3-aminobenzoate | do | Greenish-yellow. |
| 12 | 2-cyano-4-nitroaniline | do | Do. |
| 13 | 4-chloroaniline | 2:6-dihydroxypyridine | Do. |
| 14 | 4-cyanoaniline | do | Do. |
| 15 | 3-nitroaniline | do | Do. |
| 16 | 4-diethylaminoaniline | do | Violet. |
| 17 | Ethyl 4-aminobenzoate | 2:6-dihydroxy-4-methylpyridine | Greenish-yellow. |
| 18 | 4-aminodiphenyl | do | Yellow. |
| 19 | Ethyl 4-aminobenzoate | 2:6-dihydroxy-4-carbamoylmethylpyridine | Greenish-yellow. |
| 20 | 4-bromoaniline | 2:6-dihydroxy-4-phenylpyridine | Do. |
| 21 | 3-chloroaniline | do | Do. |
| 22 | 4-anisidine | 2:6-dihydroxy-4-(p-chlorophenyl)pyridine | Reddish-yellow. |
| 23 | 4-nitroaniline | 2:6-dihydroxy-4-(p-methoxyphenyl)pyridine | Greenish-yellow. |
| 24 | 2-nitroaniline | 2:6-dihydroxy-4-cyanopyridine | Do. |
| 25 | 4-chloroaniline | do | Do. |
| 26 | Ethyl 4-aminobenzoate | do | Do. |
| 27 | 4-methoxy-2-nitroaniline | do | Orange. |
| 28 | do | 2:6-dihydroxy-4-(carbo-β-ethoxyethoxy)pyridine | Do. |
| 29 | 2-chloroaniline | do | Greenish-yellow. |
| 30 | Ethyl 4-aminobenzoate | do | Do. |
| 31 | 4-chloroaniline | do | Do. |
| 32 | do | 2:6-dihydroxy-4-(carbo-β-hydroxyethoxy)pyridine | Do. |
| 33 | 2-toluidine | do | Yellow. |
| 34 | 4-chloroaniline | 2:6-dihydroxy-4-phenoxycarbonylpyridine | Greenish-yellow. |
| 35 | 4-trifluoromethylaniline | do | Do. |
| 36 | 4-methylsulphonylaniline | do | Do. |
| 37 | 3-nitroaniline | 2:6-dihydroxy-4-carbamoylpyridine | Do. |
| 38 | 2-nitraniline | do | Do. |
| 39 | do | 2:6-dihydroxy-4-N-ethylcarbamoylpyridine | Do. |

| Example | Amine | Coupling Component | Shade |
|---|---|---|---|
| 40 | Ethyl 4-aminobenzoate | do | Do. |
| 41 | 3-nitroaniline | do | Do. |
| 42 | do | 2:6-dihydroxy-4-N:N-diethylcarbamoylpyridine | Do. |
| 43 | 2-nitroaniline | 2:6-dihydroxy-4-(piperdin-1'-ylcarbamoyl)pyridine | Do. |
| 44 | do | do | Do. |
| 45 | 4-chloroaniline | 2:6-dihydroxy-4-N-phenylcarbamoyl pyridine | Do. |
| 46 | 4-methoxy-2-nitroaniline | do | Do. |
| 47 | 2-chloroaniline | do | Orange. |
| 48 | 4-acetylaminoaniline | 2:6-dihydroxy-4-(N-p-methoxyphenylcarbamoyl) pyridine. | Greenish-yellow. |
| 49 | 4-acetylaniline | 2:6-dihydroxy-4-carboethoxypyridine | Reddish-yellow. |
| 50 | Aniline 4-sulphonamide | do | Greenish-yellow. |
| 51 | Aniline 4-sulphonanilide | do | Do. |
| 52 | Aniline 4-sulphon-N-methylamide | do | Do. |
| 53 | Aniline 4-sulphon-N:N-diethylamide | do | Do. |
| 54 | 4-aminobenzamide | do | Do. |
| 55 | 4-aminobenz-N-methylamide | do | Do. |
| 56 | β-Methoxyethyl 3-aminobenzoate | do | Do. |
| 57 | β-Hydroxyethyl 3-aminobenzoate | do | Do. |

2:6-Dihydroxy-4-carbethoxy was obtained by esterifying citrazinic acid with ethanol.

2:6-Dihydroxy-4-(phenyl or p-chlorophenyl)pyridine were obtained by reacting ethyl β-(phenyl or p-chlorophenyl) glutaconate with ammonia.

2:6-Dihydroxy-4-cyanopyridine was obtained by heating 2:6-dihydroxy-4-carbamoylpyridine with $P_2O_5$.

2:6-Dihydroxy-4-[carbo-β-ethoxyethoxy or carbo-β-hydroxyethoxy]pyridine were obtained by esterifying citrazinic acid with β-ethoxyethanol and ethyleneglycol respectively.

2:6-Dihydroxy-4-phenoxycarbonylpyridine was obtained by transesterification of 2:6-dihydroxy-4-carboethoxypyridine with phenol.

2:6-Dihydroxy-4-carbamoylpyridine was obtained by treating ethyl acetylcitrate with ammonia.

2:6-Dihydroxy-4-[N-ethylcarbamoyl, N:N-diethylcarbamoyl, piperdin-1'-ylcarbamoyl, N-phenylcarbamoyl and N-p-methoxyphenyl-carbamoyl]pyridine were obtained by reaction of 2:6-dihydroxy-4-carboethoxypyridine with ethylamine, diethylamine, piperidine, aniline and p-anisidine respectively.

The remaining coupling components used in the Examples are known compounds.

EXAMPLE 58.

100 parts of a woven aromatic polyester material are immersed in a dyebath comprising a dispersion of 1 part of 2:6-dihydroxy-3-(p-chlorophenylazo)-4-carboethoxypyridine and a dispersion of 6 parts of o-phenylphenol in 3,000 parts of water containing 3 parts of the disodium salt of a dinaphthylmethane disulphonic acid, and dyeing is then carried out for 90 minutes at 100° C. The dyed textile material is then removed from the dyebath and after-treated as described in Example 1.

The aromatic polyester textile material is dyed a greenish-yellow shade of excellent fastness properties.

EXAMPLE 59

A print paste is prepared comprising:

| | |
|---|---|
| 2:6-dihydroxy-3-(2'-cyano-4'-nitrophenylazo)-4-carboethoxypyridine | 10 parts |
| Gum Tragacanath | 200 parts |
| Water | 790 parts |
| Total: | 1000 parts | and is then printed on to a woven cellulose triacetate textile material by screen printing. The printed material is dried at 60° C. and is then steamed for 30 minutes using saturated steam at atmospheric pressure. The printed textile material is then treated for 5 minutes in a 0.2 percent aqueous solution of a synthetic detergent at 50° C., rinsed in water and dried.

A bright greenish-yellow print is thereby obtained which possesses excellent fastness to light and to wet treatments.

A woven secondary cellulose acetate textile material can also be printed with the print paste using the above method.

The above print paste can also be printed onto a woven aromatic polyester textile material, and the material, after being dried, is subjected for 30 minutes to saturated steam at 120° C. A greenish-yellow print of excellent fastness properties is thereby obtained.

EXAMPLE 60

100 parts of secondary cellulose acetate in the form of yarn are immersed in a dyebath comprising a dispersion of 1 part of 2:6-dihydroxy-34-carboethoxy-pyridine in 3,000 parts of water containing 3 parts of a condensate of 22 mols of ethylene oxide with 1 mol of cetyl alcohol, and dyeing is then carried out for 1 hour at 85° C. The dyed yarn is then removed from the dyebath, rinsed in cold water and dried.

The yarn is thereby colored a greenish-yellow shade possessing good fastness to light and to washing.

EXAMPLE 61

A woven aromatic polyester textile material is padded through a liquor comprising 20 parts of 2:6-dihydroxy-3-(p-carboethoxyphenylazo)-4-cyanopyridine dispersed in 1,000 parts of water containing 2 parts of a condensate of 9 mols of ethylene oxide with 1 mol of nonylphenol, and the textile material is then squeezed between rollers so that it only retains its own weight of the said liquor. The textile material is dried at 60° C., and is then baked for 1 minute at 200° C. The textile material is then rinsed in water, treated for 10 minutes in a 0.2 percent aqueous solution of a synthetic detergent at 70° C., rinsed again in water and finally dried.

The textile material is thereby colored a bright yellow shade of excellent fastness properties.

EXAMPLE 62

100 parts of cellulose triacetate yarn are immersed in a dyebath comprising a dispersion of 1 part of 2:6-dihydroxy-3-(o-chlorophenylazo)-4-(carbo-β-ethoxyethoxy)pyridine in 3,000 parts of water containing 6 parts of diethyl phthalate and 3 parts of the sodium salt of a sulphated mixture of cetyl and oleyl alcohols, and dyeing is then carried out for 90 minutes at 100° C. The yarn is then removed from the dyebath, rinsed in water, treated for 30 minutes in a 0.2 percent aqueous solution of a synthetic detergent at 60° C., rinsed again in water, and is finally dried. The yarn is thereby dyed a bright greenish-yellow shade of excellent fastness to light and to wet treatments.

Polyhexamethylene adipamide in the form of yarn is dyed by the same method except that the diethylphthalate is omitted from the dyebath and dyeing is carried out at 95° C. instead of 100° C. A bright greenish-yellow dyeing of excellent fastness properties is obtained.

What we claim is:

1. Process for coloring synthetic textile materials selected from the class consisting of polyester, cellulose acetate and polyamide textile materials, which comprises treating said textile materials with an aqueous dispersion of a water-insoluble monoazo dyestuff free from sulphonic acid and carboxylic acid groups and which, in one of the possible tautomeric forms, is represented by the formula:

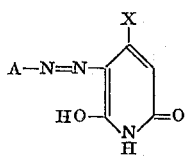

wherein A is an optionally substituted phenyl or naphthyl radical; and X is selected from the class consisting of hydrogen, lower alkyl, carbo lower alkoxy, carbo hydroxy lower alkoxy, carbo lower alkoxy lower alkoxy, phenoxycarbonyl, cyano, carbamoyl, N-lower alkyl carbamoyl, N:N-di(lower alkyl) carbamoyl, N-phenylcarbamoyl, piperdin-1-ylcarbamoyl, N-methoxyphenylcarbamoyl, phenyl, chlorophenyl and methoxyphenyl.

2. Process as claimed in claim 1 wherein the textile material is a polyethylene terephthalate textile material.

* * * * *